Patented July 17, 1923.

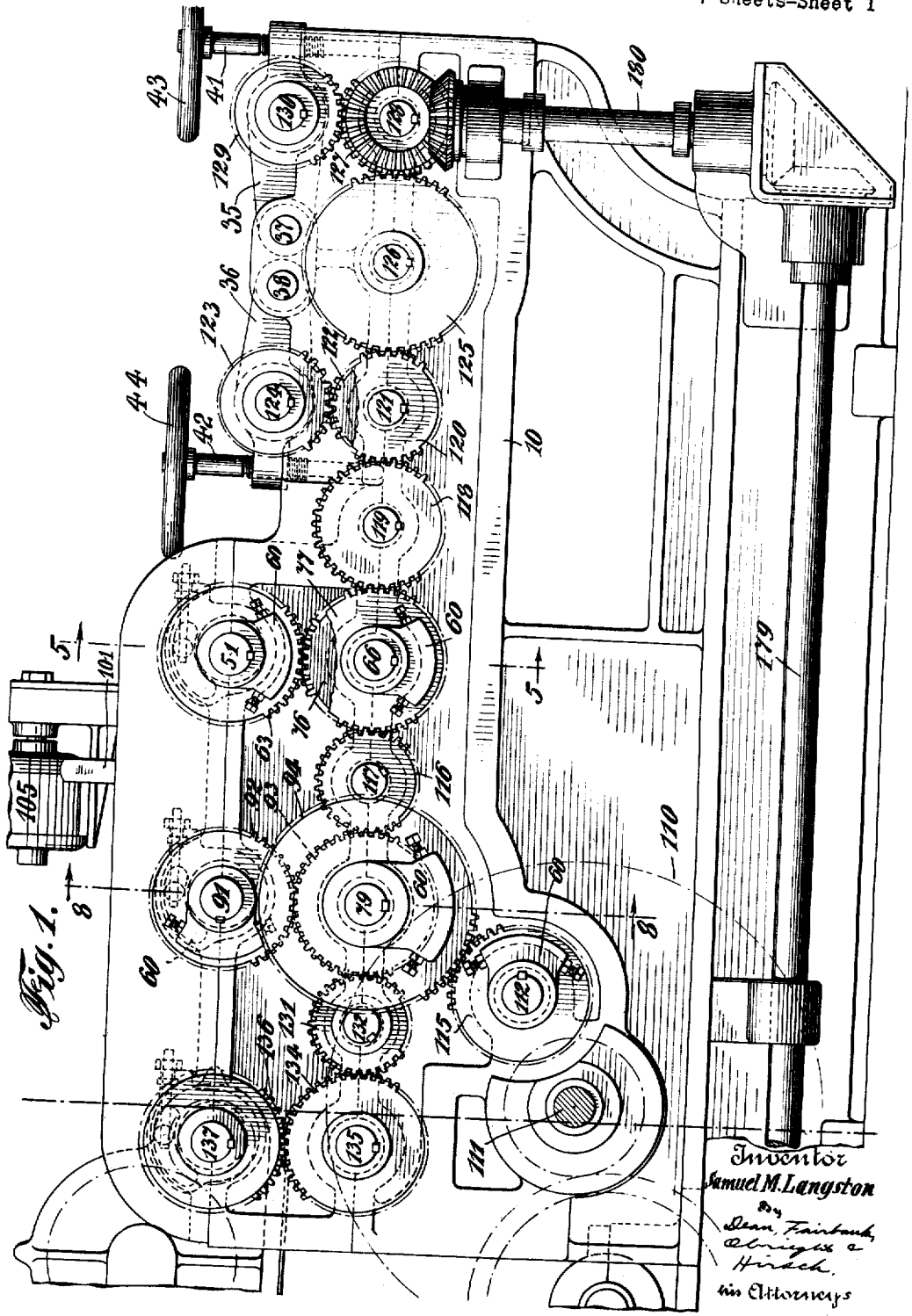

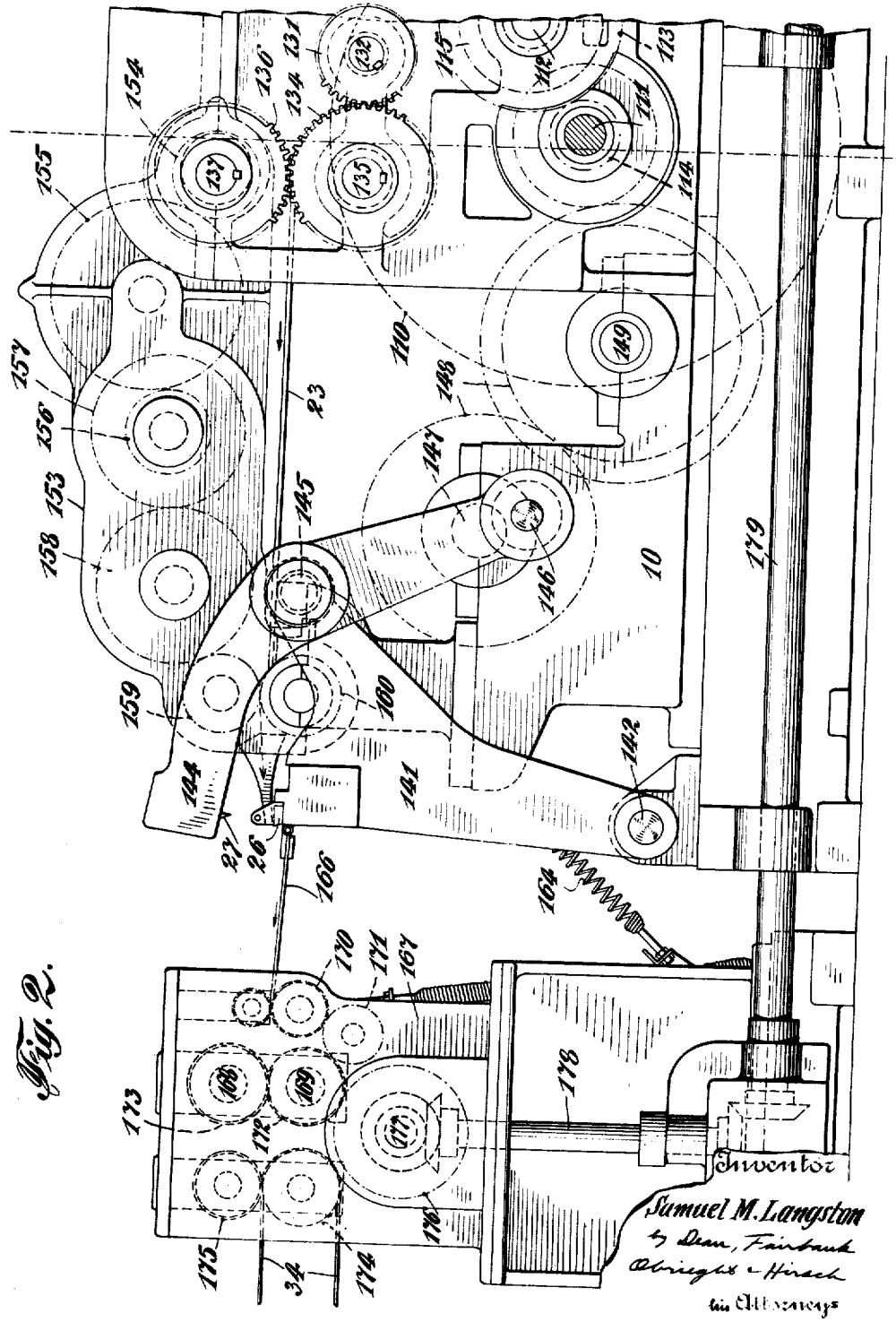

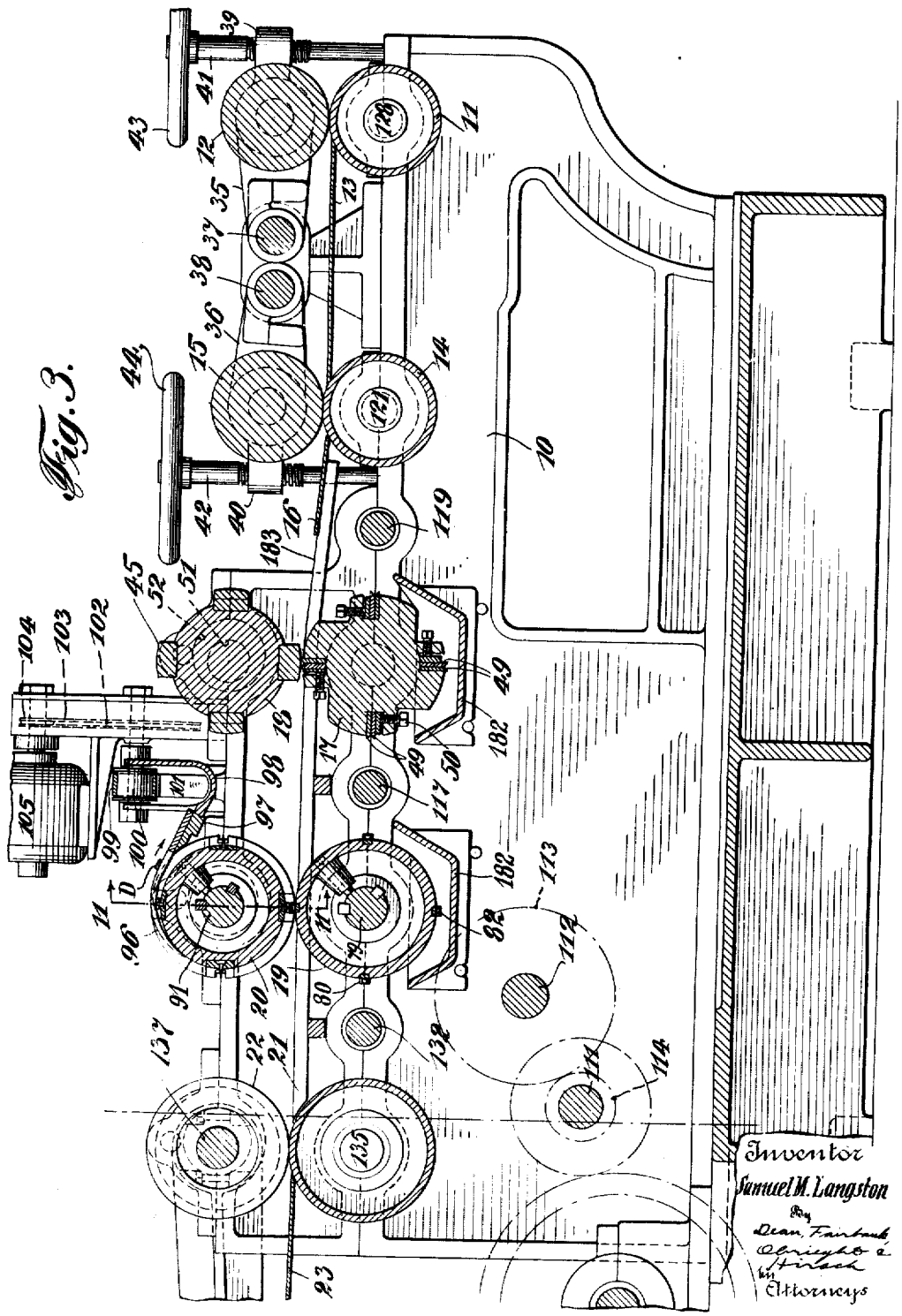

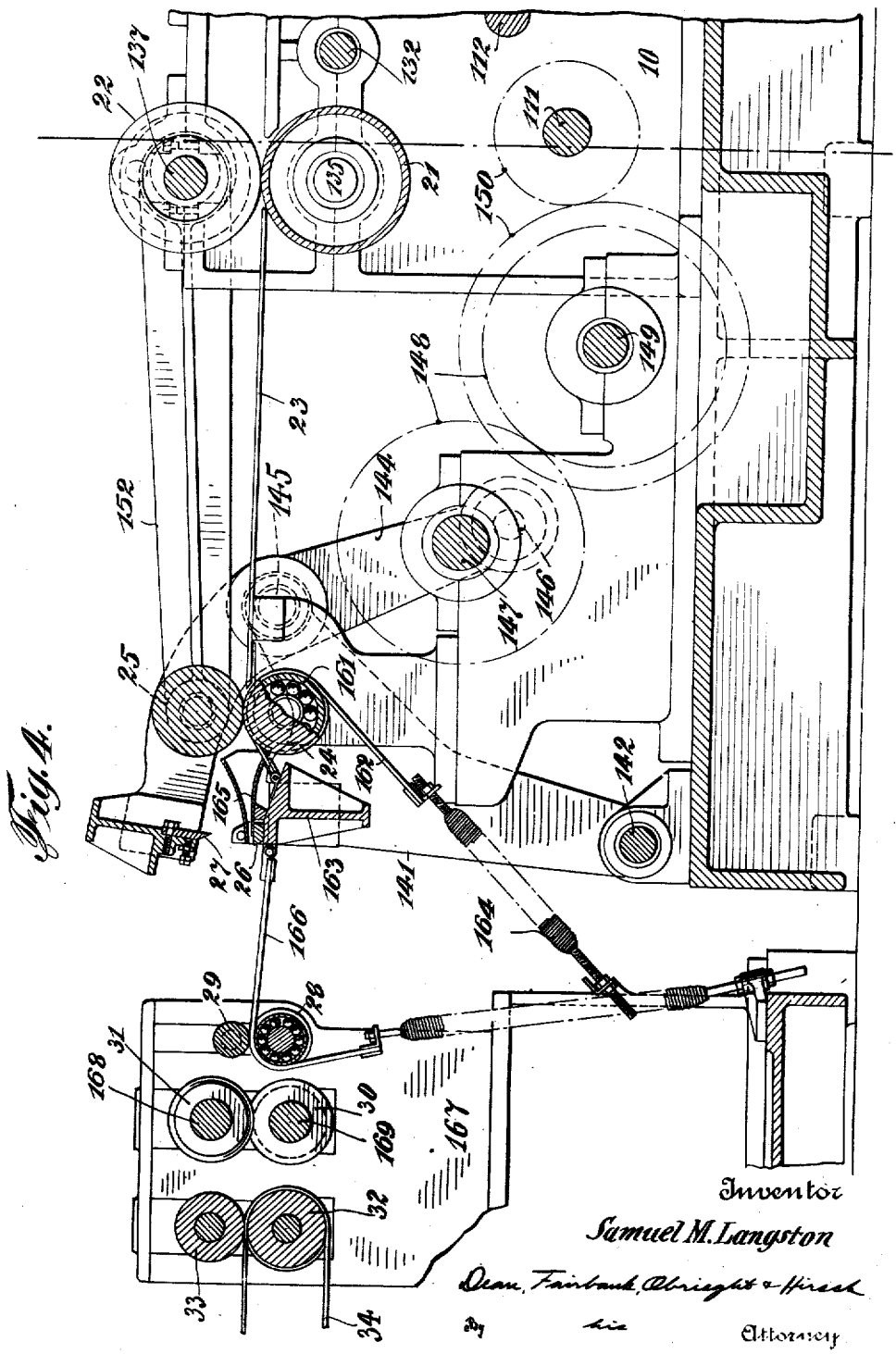

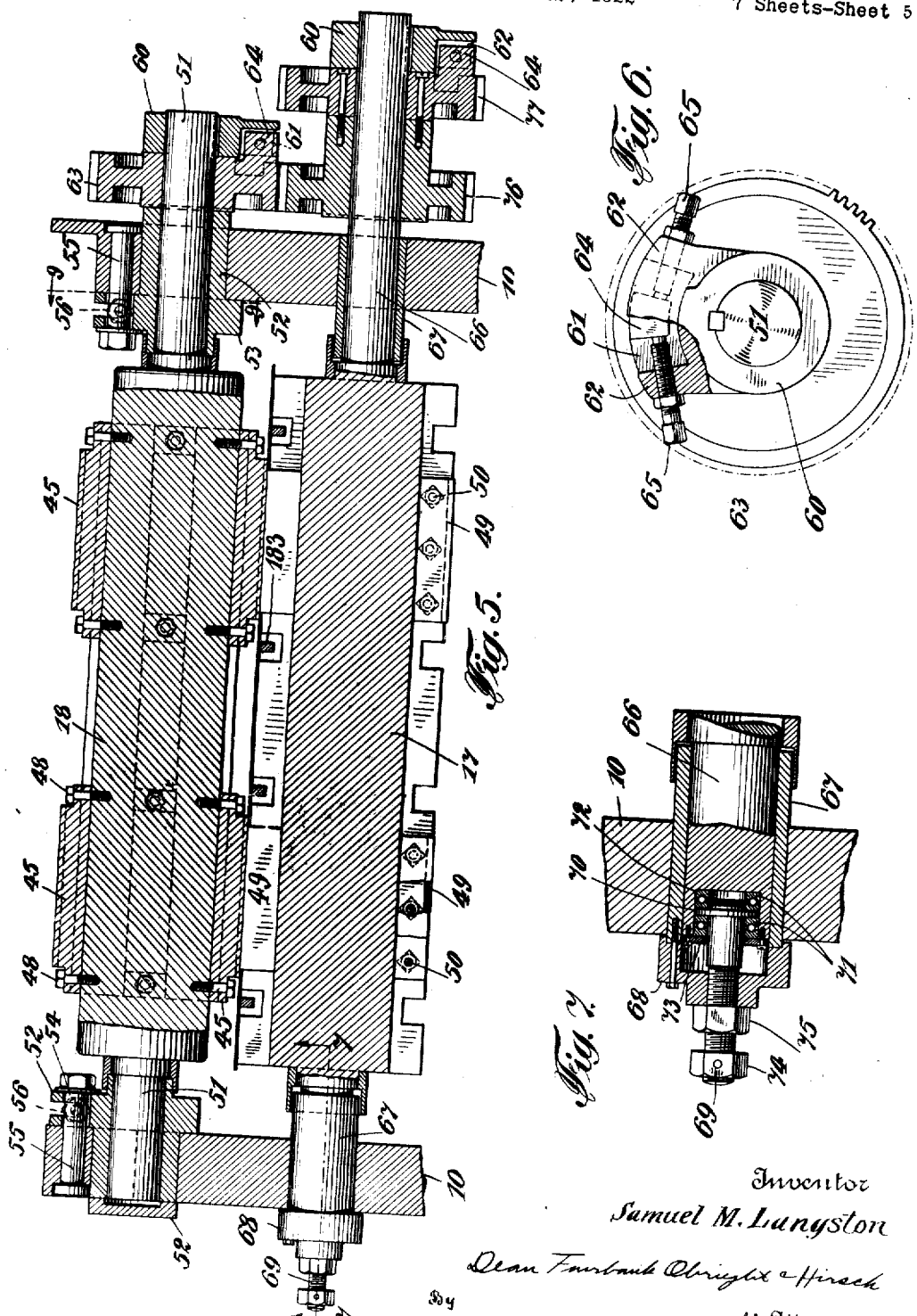

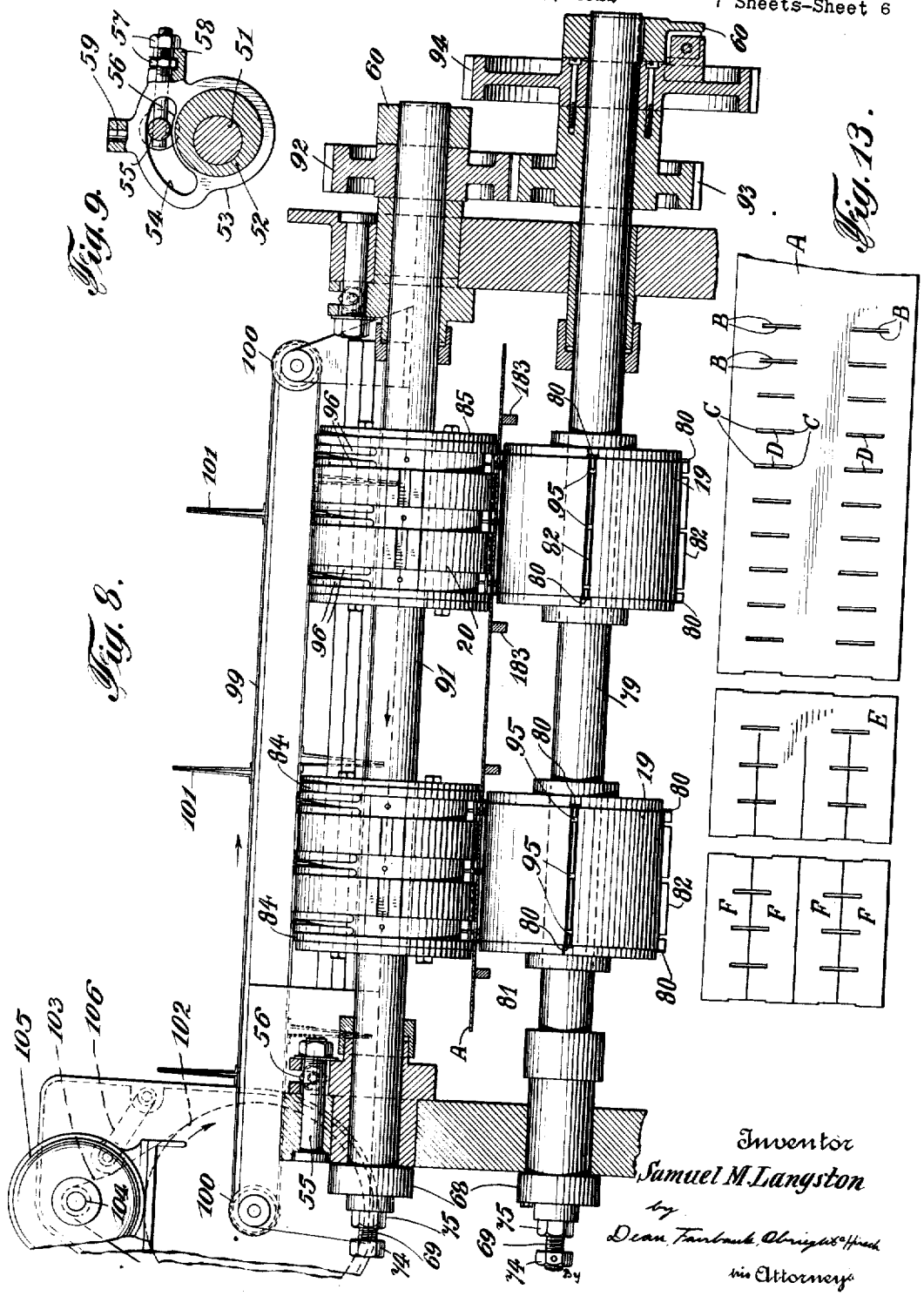

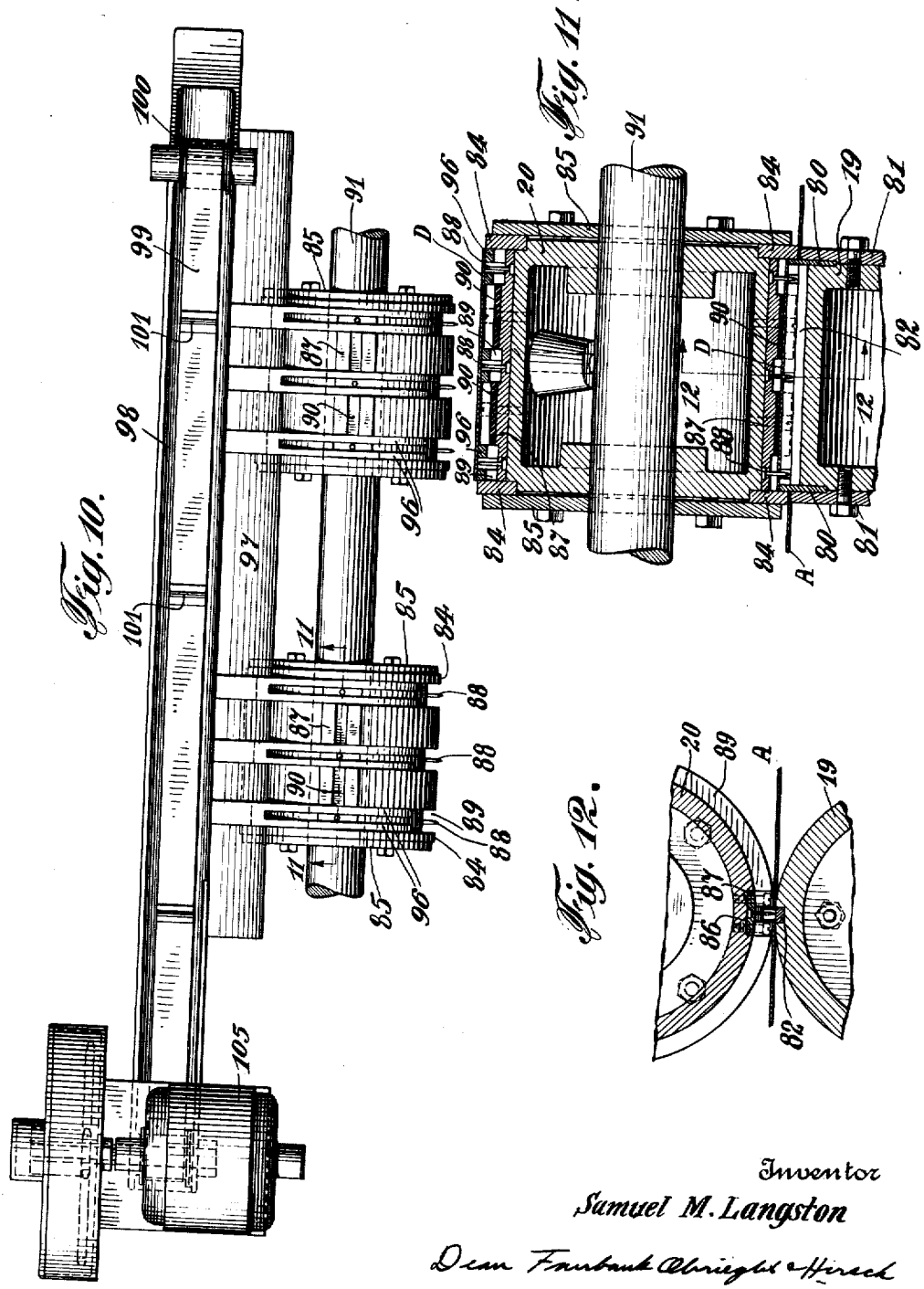

1,462,138

UNITED STATES PATENT OFFICE.

SAMUEL M. LANGSTON, OF WENONAH, NEW JERSEY.

MACHINE FOR MAKING FIBER SHINGLES.

Application filed April 22, 1922. Serial No. 555,936.

*To all whom it may concern:*

Be it known that I, SAMUEL M. LANGSTON, a citizen of the United States, and resident of Wenonah, in the county of Gloucester and State of New Jersey, have invented certain new and useful Improvements in Machines for Making Fiber Shingles, of which the following is a specification.

This invention is a machine for cutting a sheet of material transversely and longitudinally into a plurality of units as the sheet is delivered through the machine from a roll or other source of supply.

My improved machine is intended primarily for cutting prepared roofing material into shingle strips, each having one or more notches or recesses in one of the longer edges, so as to form two or more tabs each of a length corresponding to that of an individual shingle. The sheet may be of any material suitable for the purpose, as for instance paper, felt, asbestos, or the like, saturated or treated with asphalt, tar, or other waterproofing composition, and preferably coated on one surface with grit, crushed slate or other mineral or fireproofing material.

Although certain features of my improved machine are useful in cutting other kinds of sheet material into units intended for other purposes, the main object of the invention is to provide a machine for carrying out the method claimed in my Patent 1,441,359, issued January 9th, 1923.

A further object of my invention is to provide improved means for forming slots or apertures in continuously advancing material. As important features of the mechanism provided for carrying out this object I provide means for first cutting slits transversely of the sheet and corresponding in position to the opposite sides of the desired slots or aperture, and thereafter by separate cutting means connecting these slits at their ends and removing the resulting waste pieces. The separate cutters are so designed and mounted that relative adjustment transversely of the machine may be secured and relative rotary adjustment also secured, so that the cuts produced by one set of cutters will properly register with those produced by the other.

A further object of my invention is to provide means whereby the waste pieces severed upon the forming of the slots or apertures are removed and conveyed away from the sheet.

As a further important feature, I provide means whereby the sheet material, even though very flexible, may be properly supported and delivered to a cutter movable back and forth in the general direction of the movement of the sheet material.

The improved machine shown in the accompanying drawings involves a large number of other important features and results in the accomplishment of various other objects, all of which will be set forth hereinafter, or will be apparent from a study of the details of construction and general arrangement of the parts.

In these drawings:

Fig. 1 is a side elevation of the drive side of the machine at the receiving end.

Fig. 2 is a side elevation of the drive side of the machine at the delivery end.

Fig. 3 is a vertical longitudinal section through the portion of the machine shown in Fig. 1.

Fig. 4 is a vertical longitudinal section through the portion of the machine shown in Fig. 2.

Fig. 5 is a vertical transverse section on the line 5—5 of Fig. 1, and through the first set of cutters.

Figs. 6 and 7 are details on the lines 6—6 and 7—7 respectively of Fig. 5.

Fig. 8 is a vertical transverse section on the line 8—8 of Fig. 1 through the second set of cutters.

Fig. 9 is a sectional detail on the line 9—9 of Fig. 5 or the corresponding line on Fig. 8.

Fig. 10 is a top plan view of the parts shown in Fig. 8.

Fig. 11 is a section on the line 11—11 of Figs. 3 and 10.

Fig. 12 is a sectional detail on the line 12—12 of Fig. 11, and

Fig. 13 is a diagrammatic plan view showing successive portions of the sheet as acted upon while passing through the machine.

The machine as illustrated is provided with a pair of main frame members 10 which support the various transversely extending shafts, feed rolls, cutters and other connecting, operating and sheet supporting parts. To cut the sheet of material A as in the manner shown in Fig. 13, the sheet enters the machine at the right hand end of Figs. 1 and 3, passes between a pair of superposed feed rolls 11, 12, and thence across a support or guide 13 to a second pair of feed rolls 14, 15. From these it passes across a suitable support or guide 16 to the coacting rotary cutter 17, and platen roller 18, which cut pairs of transversely extending slits B therein. The sheet then passes to a pair of coacting rotary cutters 19, 20, which cut short slits C lengthwise of the sheet at spaced points to connect the pairs of slits and permit removal of the circumscribed waste pieces D and the forming of one or more rows of slots or perforations in the sheet.

The sheet then passes to a pair of feed rollers 21, 22, then across a support 23 to another pair of feed rollers 24, 25, then between the cut-off knives 26, 27 which sever the sheet transversely into sections E of the desired length and at points properly located in respect to the location of the previously formed slots or apertures. The separate sections pass to feed rollers 28, 29, then between pairs of coacting slitters 30, 31, which slit the sections lengthwise in to the final shingle strips, F. The strips are delivered from the slitters through feed rolls 32, 33, the lower one of which may serve as a pulley for a conveyor belt 34.

The various feed rollers and cutting elements are positively operated and are properly timed in respect to each other so that all of the cuts will come in proper registry. Considering the various operating parts more in detail and with special reference to the specific form illustrated in the drawing, it will be noted that the feed rollers 11 and 14 are mounted in bearings carried by the main frame members 10 of the machine. The feed rollers 12 and 15 are journaled in bearings carried by pairs of arms 35, 36, journaled on transverse pivot pins or shafts 37, 38. The rollers 12 and 15 are made comparatively heavy so that they may exert the desired pressure on the material and effect the proper feeding action. The pivoted arms 35 and 36 have extensions 39, 40 receiving screw bolts 41, 42. These, at their lower ends, abut against the frame and at their upper ends are provided with hand wheels 43, 44. By rotating these screw bolts the upper pressure rollers 12 and 15 may be raised to space them at any desired distance above the lower rollers 11 and 14, to facilitate threading or cleaning of the machine. In operation the bolts are so adjusted as to permit free vertical floating of the rollers 12 and 15 in accordance with the character or thickness of the material acted upon by the machine.

The upper member 18 which coacts with the first rotary cutter serves as a bed roll or platen and presents a hardened surface against which the knives on the other rotary member 17 act. The rotary members 17, 18, are of such diameter and of such character as to produce the desired number of the pairs of parallel transverse slits, each of the desired length and spaced to the desired distance lengthwise and crosswise of the sheet. As shown, one complete rotation of these rotary members acts to cut four pairs of transverse slits in each of a plurality of rows lengthwise of the sheet. The upper member or roller 18 is shown as having two annular rows of hardened steel blocks 45 secured thereto, each annular row containing four of such blocks or backing plates equally spaced circumferentially of the roller. The outer surfaces of these blocks are curved to all lie in the same cylindrical surface. The blocks are mounted in longitudinally extending grooves, and are independently removable, each being secured in its groove by a pair of screw bolts 48 as shown particularly in Fig. 5. By the drilling of appropriate threaded holes in the roller the backing blocks or plates 45 may be positioned at any desired point lengthwise of the roller 18 and a larger or smaller number of longer or shorter blocks may be employed.

The lower member 17 is provided with radial slots extending lengthwise thereof, and corresponding in number and circumferential spacing to the number of the backing blocks or plates 45 on the upper roller 18. Within each such slot or groove I mount a pair of knives 49, the two knives lying side by side in the slot and rigidly locked in position by two or more set screws 50. The knives are oppositely beveled and of the proper thickness so as to space apart their cutting edges to distances corresponding to the desired distance between the pair of slits which are to be formed in the sheet material. These knives are of the desired length and preferably slightly shorter than the corresponding backing or anvil blocks on the upper roller. They are secured in place in the proper positions lengthwise of their grooves in the roller 17, so as to properly register with the backing or bed blocks, as shown particularly in Fig. 5. Obviously the number and character of the knives, and the length and spacing thereof, may be varied in accordance with the character of cuts or slits which it is desired to form in the sheet material.

In operation, the two rollers 17 and 18 are so supported or mounted that the edges of the knives pass through the material and come closely adjacent to or into direct contact with the hardened surface of the backing block. If the materials operated upon have a grit or crushed slate coating on one side, this coated side is preferably uppermost so as to engage with the surface of the backing blocks 45, and it is not necessary for the knives to come into direct contact with said backing blocks. If the knives cut through the body portion of the sheet, the sheet will be completely severed, even though the knives do not pass all of the way through the grit, sand or crushed slate coating. This slight spacing of the knives from the backing permits the knives to remain sharp for a very much longer period, as they are not dulled by cutting through sand, flint or slate particles which come between their edges and the backing plate.

In order to properly adjust the two rollers in respect to each other, and in accordance with the character or thickness of the sheet material acted upon, or to space the cutters so that the sheet may pass freely therethrough, one of the rollers is provided with vertically adjustable bearings. As shown, the shaft 51 of the upper roller 18 is mounted in bearing sleeves 52 which have their outer surfaces eccentric in respect to their shaft receiving opening, as indicated in dotted lines in Fig. 3, and as shown in Fig. 9. By oscillating these bearing sleeves the shaft may be raised or lowered at will. The means for adjusting and controlling these eccentric sleeves is shown particularly in Fig. 9, and includes a collar 53 rigid or integral with the eccentric sleeve. The collar has a slot 54 through which extends a pin 55 mounted in the frame of the machine. The pin may oscillate, and carries rigid therewith an arm or link 56 which is threaded and receives a pair of lock nuts 57 for clamping therebetween a flange or lug 58 on the collar 53. By adjusting the nuts 57 lengthwise of the arm 56, the eccentric sleeve may be caused to rotate in the desired direction and to raise or lower the shaft of the upper cutter roller. By loosening one of the nuts 57, but without disturbing the other, the arm 56 may be swung upwardly out of engagement with the flange or lug 58, so that the sleeve is free to rotate. The rotation of the shaft being clockwise, as viewed in Fig. 9, the frictional engagement of the shaft with the bearing sleeve will tend to rotate the sleeve with the shaft until the pin 55 comes to the end of the slot 54. This will bring the thickest portion of the eccentric sleeve to a position directly below the shaft and raise the shaft and its roller to the limiting position. Thus the lifting of the lever arms or links 56 at the opposite ends of the roller, not only liberates the bearing sleeve, but may cause the automatic separation of the cutting rollers to the maximum extent. This is particularly important in running the machine idle or in threading it up. It will be noted that if the adjustment of the nuts 57 on the links 56 is not disturbed, and the links merely swung upwardly to liberate the bearing sleeves, the parts may be brought back to the previous accurately determined adjustment by merely rotating the bearing sleeves to such an extent that the locking and adjusting links 56 may be swung back into position. Thus, no care or accuracy is required in re-establishing a previously determined adjustment after the rolls have been separated for cleaning or any other desired purpose.

For positively rotating the sleeves, irrespective of whether or not the machine be running, each collar 53 is preferably provided with a lug 59 with means such for instance as a radial socket, to receive a bar, tool or handle of such length as to give the proper leverage. In case of unequal wear of the knives or backing plates, the two rollers may be adjusted to bring the knives and backing plates at the desired spacing, even though this involves a raising of one end of the upper roller slightly higher than the opposite end.

The backing plates or blocks 45 are each materially greater in width than the distance between the pair of knives which coact therewith, and means are provided whereby a rotary adjustment of one roller may be secured in respect to the other so that the cutting edges may be brought to bear against different portions of the backing surface and distribute the wear on the latter and to permit new portions of the surface to be brought into operation when other portions have become cut or scored.

As shown particularly in Figs. 5 and 6, the shaft 51 has a collar 60 keyed thereto and provided with a projection portion including a recess 61 between two radial spaced walls 62. The driving pinion 63 of the upper shaft is loose thereon, but is provided with a lug 64 projecting into the recess 61. The radial walls 62 carry set screws 65 which may be adjusted into locking engagement with opposite sides of the lug 64, as shown in Fig. 6, so as to positively lock the pinion 63 to the collar 60, and thus to the shaft 51. By loosening one set screw 65 and tightening the other, the shaft 51 may be rotated in either direction in respect to its driving pinion and therefore in respect to the other operating parts of the machine.

In order that the knives 49, after having been secured to the roller 17 at the desired distance apart, may be adjusted transversely of the sheet so as to bring the slits B at the proper points in respect to one edge of the sheet A or symmetrically in respect to the opposite edges, means are provided for the axial adjustment of the cutting roller 17. As shown particularly in Fig. 7, the shaft 66 of the roller 17 is mounted in a pair of rigid bearing sleeves 67. One of these sleeves, preferably the one at the side of the machine opposite to that having the gear drive, is provided with a cap 68 within which is mounted an adjusting bolt 69.

This bolt has a head 70 mounted between a pair of thrust bearings 71 disposed in a recess 72 in the end of the shaft. The bearings and head are held against longitudinal movement in respect to the shaft by a retaining collar or flange 73. Thus the shaft is free to rotate independently of the adjusting bolt, but is held against longitudinal movement in respect to the latter. The bolt is provided with a nut or head 74 which is keyed or otherwise locked on the bolt so that by turning it the bolt may be rotated and moved endwise in the cap 68 and bearing sleeve 67. This endwise adjustment of the shaft moves the entire cutting roller 17 and the knives 49 transversely of the direction of movement of the sheet material to be cut. When in the desired position the adjusting member 69 may be locked by a suitable lock nut 75.

In order to advance or retard the position of the slits in respect to the other cutting operation and particularly the cut off or chopper, I provide means for imparting rotary adjustment to the cutter roller 17. As shown the shaft 66 has a gear 76 loose thereon and meshing with the gear 63 of the upper roller. The gear 76 is rigidly secured to a gear 77 so connected to the shaft as to permit the rotary adjustment of the shaft therein. This adjusting mechanism may be substantially identical with that shown in Fig. 6 and previously described. Thus, the upper cutting roller 18 may be raised or lowered, and may be adjusted circumferentially in respect to its driving gear, and the lower cutting roller 17 may be adjusted axially and also circumferentially in respect to its driving gear.

By means of the cutting rollers 19 and 20, the two slits B of each pair formed by the pairs of knives 49 are connected together at each end by cuts C so as to form slots or apertures D in the material, and the waste pieces thus circumscribed are removed from the sheet. The lower cutting roller 19 may be made up of a plurality of separate sections corresponding to the number of pairs of knives 49 in each groove. As shown particularly in Fig. 8, this cutting roller has two such sections keyed on a shaft 79 to permit endwise adjustment, and normally locked against such endwise movement by a set screw or the like. Each cutting roll or cutting roll section 19 has a plurality of radially extending knives 80 mounted in radial grooves in the opposite ends thereof as shown in Figs. 3 and 11. These knives are each of a width substantially equal to the distance between the cutting edges of the two knives 49 of each pair and the knives 80 are spaced apart transversely of the sheet to a distance equal to the length of the knives 49. The cutting rollers 19 are preferably of the same diameter as the cutting rolls 17, so that there are the same number of pairs of knives 80 as there are pairs of knives 49. The knives may be locked in place by clamping plates 81 engaging with the ends of the cutting roller or roller section 19. The cutting roller 19 preferably has longitudinally extending grooves in its periphery each extending from one knife 80 to the other and within each groove is a web or flange 82 extending outward radially beyond the surface of the roller so as to force out the severed pieces in a manner more fully explained hereinafter. This flange or web is preferably slightly narrower than the width of the corresponding knives 80. The upper cutter roller 20 is also preferably formed of sections corresponding substantially to the length of the sections of the roller 19. The upper roller, or each section thereof, has annular knives 84 which are secured in place by end plates 85, and which are spaced apart to such distance that the knives 80 pass therebetween with a shearing action against the inner edges of the knives 84, as shown particularly in Fig. 11. The annular knives 84 are adjustable circumferentially of the roller 20 so that as the narrow portions of the edge thereof which coact with the narrow knives 80, become dulled, the knives may be adjusted to bring new portions of the cutting edge into operative position. The roller 20 is provided with longitudinal grooves 86 spaced apart to distances corresponding to the spacing of the flanges 82 of the roller or drum 19, and each of a width somewhat greater than that of said flanges. Within these grooves 86 are plates or bars 87 each carrying a plurality of radially extending pins 88, the points of which extend out slightly beyond the periphery of the roller. The rollers are also provided with circumferential grooves 89 spaced apart axially and corresponding in spacing and position to that of the pins 88, each pin being midway between the side edges of a circumferential groove. Each bar 87 has a longitudinally extending groove in its outer surface to receive the corresponding flanges 82 of the other roller. Each flange 82 has notches 95 to receive the pins 88. Within the groove of each bar 87 there is mounted a resilient block or plate 90 preferably of rubber, which will be compressed as the waste pieces are forced out of the sheet material by the flanges 82, and on to the pins 88. These serve primarily to prevent the cut out pieces from turning edgewise as they are pushed out by the flanges 82. The resiliency is not sufficient to force the pieces off the pins or to prevent the pieces from being bodily carried away from the sheet by the pins.

In the operation of the cutters on the rollers or drums 19 and 20, the portion of the material between each pair of slits previously formed by the knives 49 is severed at the ends of said slits by the action of the knives 80 and 84, and the severed part is forced on to the pins 88, by the flanges 82, so as to be attached to the roller 20, and is carried from the sheet by said roller.

The drum or drum sections 20 are mounted on a shaft 91, and the two shafts 79 and 91 are geared together for simultaneous and opposite rotation by gears 92, 93, as shown in Fig. 8. The gear 93 is connected to a gear 94, and the two gears 92, 94 are connected to their respective shafts 91 and 79 by collars 60 and adjustably connected lugs of the character shown in Fig. 6, so that each shaft and drum may be rotatably adjusted in respect to its driving gear. Both shafts have means substantially the same as that shown in Fig. 7, for adjusting them axially so as to properly register in respect to each other, and so as to properly register on the sheet with the slits B which have been cut in the latter by the knives 49.

For removing the severed pieces from the roller 20 I provide stripper mechanism which preferably includes curved bifurcated stripper fingers 96 attached to a transversely extending support 97 above and at the feed side of the roller 20. These fingers extend over the upper surface of the roller and are disposed in the grooves 89, the two forks or bifurcations of each stripper finger lying upon opposite sides of the pins 88. The free ends of these stripper fingers lie in the bottom of the grooves, and thus as the roller rotates the ends of the fingers pass under the severed strips D of material and wedge or force them out radially and disengage them from the carrying pins 88. The pieces as severed then slide down the upper outer surface of the fingers into a transversely extending trough 98, as shown particularly in Fig. 3.

For removing these waste pieces from the trough suitable conveyor mechanism is employed. As shown, a belt 99 is mounted on a pair of pulleys 100, and with the runs extending transversely of the machine parallel to the trough 98. The belt has a series of fingers or projections 101 which extend downwardly from the lower run of the conveyor belt into the trough and move lengthwise thereof with the lower run of the belt to carry the waste pieces along the trough and discharge them at the end of the latter. Although the belt may be positively driven by suitable gearing to the machine, it is preferable to provide an independent drive. As shown, one of the pulleys 100 has a belt pulley 102 on the shaft thereof, around which passes a belt 103 from the drive pulley 104 of a small electric motor. A suitable belt tightener 106 engages with the belt. Sprockets and a chain might be substituted for the pulleys and belt, or any other suitable driving means might be employed between the conveyor and the motor, or as previously stated, the conveyor might be operated from the drive mechanism of the machine.

After the sheet has the apertures or slots cut therein of the desired form and with the desired spacing, both transversely of the sheet and lengthwise thereof, as above described, the sheet then passes to the pair of feed rolls 21, 22, the lower one of which may be mounted in a fixed axis or bearing, while the upper one may have an eccentric sleeve bearing such as that shown in Fig. 9. This permits the upper roller to be adjusted in respect to the lower one for different thicknesses of the material, or to space the rollers to even greater distances. These feed rollers may be entirely omitted if desired.

The various parts above described are inter-connected by suitable gearing, so that they are driven at the proper rate of speed to advance the material and to register the longitudinal cuts made by the knives 80 with the transverse cuts made by the knives 49.

Preferably the feed rolls 21, 22, if employed, are driven at a slightly higher surface speed than the cutters or the feed rolls 11, 12, 14 and 15, so as to aid in keeping the material taut and preventing any slack or accumulated slip. As illustrated, the power is delivered to the machine through a belt pulley 110 indicated in dotted lines in Figs. 2 and 3, and connected by a clutch to the main drive shaft 111. This shaft drives a second shaft 112 through a pair of interchangeable gears 113, 114, at the opposite side of the machine from the main gearing hereinafter referred to. By removing these gears and substituting a pair of different pitch ratio, the feeding and cutting mechanism above described may be operated at any desired speed in respect to that of the main drive shaft 111. The shaft 112 has a gear 115 connected thereto by an adjusting collar 60, and this gear 115 meshes with the gear 94 on the shaft 79, of the cutter drum 19. The gear 93 of this shaft meshes with the gear 92 to drive the upper cutter drum 20. A pinion 116 on a cross-shaft 117 meshes with the gear 93, and with the gear 76, on the shaft 66 of the cutter drum 17 to drive the latter, and this gear 76 also meshes with the gear 63 of the shaft 51 of the upper cutter drum 18 to drive the latter. The gear 77 of the shaft 66 meshes with a pinion 118 on a cross shaft 119, and this pinion meshes with a gear 120 on the shaft 121 of the feed roller 14. This shaft 121 has a second gear 122 meshing with the gear 123 on the shaft 124 of the upper feed roll 15. The gear 122 also meshes with an idler 125 on a stub shaft 126, and the idler meshes with a gear 127 on the shaft 128 of the feed roller 11. The gear 127 meshes with a gear 129 on the shaft 130 of the upper feed roll 12.

For driving the feed rolls 21 and 22, there is provided a pinion 131 on a shaft 132 and meshing with the gear 93. It also meshes with a gear 134 on the shaft 135 of the feed roll 21. The gear 134 meshes with a gear 136 on the shaft 137 of the upper feed roll 22.

From the foregoing it will be seen that the gear ratio of all of these feeding and cutting rollers may be varied in respect to the main drive shaft 111 by changing the gears 113, 114, and that all of these feed and cutting rolls may be adjusted circumferentially and simultaneously in respect to the main drive shaft 111 by the collar 60 on the shaft 112 and the cutter rollers or drums 17, 18, 19 and 20 may be adjusted circumferentially independently of each other by the collars 60 on the shafts of these cutter rollers. Also, the cutter rollers 17, 19, and 20 may be axially adjusted for proper registration in respect to each other.

Beyond the feed rolls 21, 22, there is provided a cut off mechanism for transversely severing the sheet into sections, the mechanism being so constructed, operated and timed that the knives travel lengthwise with the sheet and at substantially the same speed as the latter during the cutting operation, and the transverse cut properly registers with the previously formed transverse slots.

Although other forms of cut off mechanism might be employed, I have illustrated and preferably employ substantially that shown and claimed in my prior Patent 1,359,076, issued November 16th, 1920. This includes a transversely extending knife 26 carried by a pair of arms 141 pivoted on a cross shaft or pivot pin 142. The other transversely extending knife 27 is carried by a pair of arms 144 pivoted intermediate of their ends to rearward projections on the arms 141, by pivots or bearings 145. The lower rear ends of the arms 144 are connected to the crank pins 146 on crank arms carried by a cross-shaft 147. This shaft is driven by suitable gearing 148 from a shaft 149 which latter is driven from the main drive shaft 111 by suitable gearing 150. The gearing 148 and 150 rotates the shaft 147 at such speed that the knife 140 swings back and forth in the general direction of movement of the material, and the knife 27 swings about the bodily movable pivot 145 so that it engages with or crosses the knife 26 while the latter is traveling at substantially the same speed as the material, and in the same direction. The knives separate again before they begin their return movement so that the continuous advance of the material is not in any way interfered with.

So far as my present invention is concerned, I do not wish to be limited to any particular means for driving the shaft 147 from the shaft 111. This gearing may be such as will operate the shaft 147 intermittently if it is desired to form comparatively long sections, or continuously if shorter sections are desired, and at varying or uniform speed, as set forth in my aforesaid Patent No. 1,441,359, granted January 9, 1923. By using either circular or elliptical gears, as there shown, the cut off mechanism may be timed to cut the sheet into longer or shorter sections, and the knives while cutting will, in any case, travel with the material at substantially the same speed as the latter.

For insuring accurate positioning of the sheet between the cutters and prevent any slack between the feed rolls 21, 22 and the knives 26, 27, there are provided additional feed rolls 24, 25, which are mounted as close as practical to the rearward position of the knives. The upper feed roll 25 is mounted in a pair of arms 152, 153, pivoted to swing about the shaft 137 as a center. One of these arms, 152, may be of any suitable character, as for instance a straight bar, as shown in Fig. 4, while the other arm, 153, serves as a casing and support for driving mechanism to rotate the feed roller 25. The shaft 137 has a gear 154 meshing with a train of gears, 155, 156, 157, and 158, the last of which meshes with a gear 159 on the shaft of the feed roller 25. The gear ratio is such in respect to the size of the feed roll 25 that the surface speed of this roller is slightly faster, for instance a fraction of a per cent, than the surface speed of the feed roller 22, so as to hold the material taut and prevent any accumulation of slack between these feed rollers. The lower feed roller 24 has a gear 160 meshing with the gear 159, so that the two rollers are positively driven at the same speed. This lower feed roller is mounted in bearings in the main frame of the machine, while the upper feed roller may float vertically, and the weight of the upper roller, plus the weight of the arms 152, 153 and the gear train, will cause the upper roller to bear down on the material with the desired pressure.

As the cut off mechanism moves back and forth in respect to the feed rolls 24, 25, I provide means whereby the material is properly supported, and prevented from sagging between the feed rolls and the cut off mechanism, and whereby it is properly guided to the cut off mechanism and prevented from rising with the upper knife as the knives separate. As shown, the lower feed roll 24 includes a plurality of sections, each alternate section 161 being of slightly smaller diameter than the main feed sections of the roller. Around each of these smaller diameter portions 161 extends a strap or belt 162 of a width corresponding to the width of the smaller diameter portion, and having its outer surface but slightly below the outer surface of the main feed sections of the roller. Preferably the smaller diameter portions 161 are in the form of loose pulleys mounted on bearings so that the belts or straps may move freely back and forth endwise. Each of the belts or straps 162 has one end secured to the cross member 163 which carries the knife 26 and has its opposite end secured to a coil spring 164, the connection being such that the tension of the spring may be varied at will.

As the arms 141 swing back and forth, the springs 164 expand and contract to keep the belt straps taut at all times, and form a continuous support from the feed roll 24 to the knife 26, irrespective of the varying width of the space therebetween. The knife supporting member 163 also carries a sheet guide in the form of a pair of converging plates 165 spaced apart to a distance but slightly greater than the thickness of the sheet to be cut, and terminating closely adjacent to the knife 26 so as to positively prevent the edge of the sheet from sticking to or traveling up with the upper knife 27 when the knives separate. By thus supporting the sheet and holding it taut in a definite plane, and by properly timing and adjusting the cutting rollers 17, 18, 19 and 20 and the shaft 146 which operates the cut off mechanism I insure the accurate cutting of the sheet into sections of uniform length and accurately position the cut between successive sections in respect to the transverse slots or perforations previously formed.

For completing the formation of the multiple shingles, the sections after being cut off by the knives 26, 27, are conveyed across the space to the feed rollers 28, 29 by belts 166, mounted and operating in a manner similar to the belts 162. The feed rolls 28, 29 are mounted in a frame 167 which frame also carries a pair of transverse shafts 168, 169, on which are mounted pairs of coacting slitters. These are so positioned lengthwise of the shafts as to cut each section transversely into shingles of the desired width and to properly locate these longitudinal cuts in respect to the location of the slots or perforations previously formed in the sheet.

Closely adjacent to the slitters 30, 31, there are a pair of feed rolls 32, 33, which receive the completed shingle strips and deliver them on to a conveying belt 34 which extends around the lower roller 32 as a pulley. The lower feed roll 30 may be driven by a gear 170 meshing with an idler 171 receiving power from a gear 172 on the lower cutter shaft 169. The upper cutter shaft may be positively driven at the same speed as the lower by a gear 173 meshing with the gear 172. The lower roller or belt pulley 32 may have a gear 174 meshing with a gear 175 the upper roller 33, and the gears 172 and 174 may be driven by a common drive gear 176. The latter may be driven from the main drive of the machine in any suitable manner. As shown, the shaft 177 of the gear 176 has a miter gear drive from a vertical shaft 178, and the latter has a miter gear drive from a longitudinally extending shaft 179. The latter is shown as being driven by miter gearing from a vertical shaft 180 which latter receives its power through miter gearing from the shaft 128 of the feed roll at the receiving end of the machine. The gearing is such that the surface speed of the feed rolls 30, 31, 32, 33, is materially faster than the surface speed of the material on its way to the cut off knives 26, 27. The upper feed roll 31 is not positively driven, but merely rests on the sheet, and the feed rolls 30, 31 may thus slip on the sheet before the section or portion between these feed rolls is severed from the body of the sheet. The end of the sheet enters between the feed rolls 30, 31 before it is cut off by the knives 26, 27, and will at that time be traveling at the same speed as the remainder of the sheet. The instant the section is cut off by the knives 26, 27, the feed rolls 30, 31 are free to advance the cut off section at a higher speed, and thus effect a desired spacing between successive cut-off sections. In order that the slitters may operate effectively they are of course driven with a higher surface speed than that of the material, and the feed rolls 32, 33 are driven at the speed at which it is desired to advance the cut off sections after the knives 26, 27 have operated.

The machine illustrated is, as previously noted, particularly intended for carrying out the process or method disclosed in my copending application, and for cutting continuously delivered sheet material into multiple shingle strips each having a series of tabs or individual shingle portions separated by notches or recesses. It will of course be evident that for forming slots, recesses or apertures of other forms or for other purposes, there would be a corresponding change in certain of the elements of the machine. The knives 49 are illustrated as of such length and so positioned as to form slots in the sheet of a length equal to twice the length of the desired notch or recess in the desired shingle strip. It will of course be evident that these knives might be of only one half the length, and so positioned that each pair cuts the slits for the recesses or notches of one shingle strip instead of two. For cutting shingle strips from sheet material saturated with waterproofing compound, it is desirable that the cutters, particularly those for forming the slots, be kept wet and cool. For this purpose I have illustrated water tanks 182 located beneath the two cutter rollers 17 and 19, so that the knives of the latter dip into the water at the lower side of the roller. As the material is often very soft and flexible, I provide guides which extend continuously from the feed rolls 14, 15, past the slot forming cutters to the feed rolls 21, 22. These are shown as bars 183 which extend through annular grooves in the lower cutter roll 17, as shown particularly in Fig. 5, and at the ends of the lower cutter roll sections 19, as shown in Fig. 8. These parts form a continuous support for the material as it passes through between the two sets of rotary cutters.

Having thus described my invention, what I claim as new and desire to secure by Letters Patent is:—

1. A machine for cutting multiple shingle strips from a prepared sheet of roofing material, each strip extending lengthwise of the sheet and having along one longitudinal edge thereof a plurality of narrow notches or recesses and interposed tabs simulating the ends of individual shingles, said machine including means for cutting a plurality of rows of transversely extending slots in the sheet, said rows extending longitudinally of the sheet and said slots being spaced at distances equal to the distances between the recesses or notches in the finished strip, cut off mechanism arranged beyond said means for severing said sheet transversely into sections, each of a length corresponding to the length of a finished strip, and means arranged beyond said cut off mechanism for separately slitting said sections in succession lengthwise along a plurality of lines.

2. A machine for cutting multiple shingle strips from a prepared sheet of roofing material each strip extending lengthwise of the sheet and having along one longitudinal edge thereof a plurality of narrow notches or recesses and interposed tabs simulating the ends of individual shingles, said machine including means for cutting a plurality of rows of transversely extending slots in the sheet, said rows extending longitudinally of the sheet, and said slots being spaced at distances equal to the distances between the recesses or notches in the finished strip, cut off mechanism for severing said sheet transversely into sections of the full width of the sheet and each of a length corresponding to the length of a finished strip, and means arranged beyond said cut off mechanism for separately slitting said sections in succession lengthwise along a plurality of lines, each row of slots or perforations being intersected by a separate one of said lines.

3. A machine for cutting multiple shingle strips from a prepared sheet of roofing material, each strip extending lengthwise of the sheet and having along one longitudinal edge thereof a plurality of narrow notches or recesses and interposed tabs simulating the ends of individual shingles, said machine including means for continuously advancing the sheet lengthwise at a uniform rate, means for cutting a row of slots therein longitudinally thereof, cut off mechanism for severing the sheet transversely into sections, and slitting mechanism arranged beyond said cut off mechanism for cutting each section along a line midway between the ends of the slots of said row.

4. A machine for cutting multiple shingle strips from a prepared sheet of roofing material, including means for continuously advancing the sheet lengthwise at a uniform rate, means for cutting a row of transversely extending slots therein longitudinally thereof, cut off mechanism for severing the sheet transversely into sections, and slitting mechanism arranged beyond said cut off mechanism for cutting each section along a line intersecting the slots of said row.

5. A machine for cutting multiple shingle strips from a prepared sheet of roofing material each strip extending lengthwise of the sheet and having along one longitudinal edge thereof a plurality of narrow notches or recesses and interposed tabs simulating the ends of individual shingles, said machine including means for cutting transversely extending openings at uniform intervals along the length of the sheet intermediate of the side edges thereof, feed mechanism for pulling the sheet through said cutting means, further feed mechanism beyond said first mentioned feed mechanism for preventing slack in the sheet between said feed mechanisms, and cut off mechanism for intermittently cutting the sheet in two between said feed mechanisms.

6. A machine for cutting multiple shingle strips from a prepared sheet of roofing material, each strip extending lengthwise of the sheet and having along one longitudinal edge thereof a plurality of narrow notches or recesses and interposed tabs simulating the ends of individual shingles, said machine including means for cutting transversely extending openings at intervals along the length of the sheet intermediate of the side edges thereof, cut off mechanism for cutting the sheet in two, feed mechanism beyond said cut-off mechanism for preventing slack in the portion of the sheet acted on by the cut-off mechanism, and means for guiding the advancing end of the body of the sheet to said feed mechanism after said cut off mechanism operates.

7. A machine for cutting multiple shingle strips of the character described, including means for cutting transversely extending openings at uniform intervals along the length of a sheet intermediate of the side edges thereof, feed mechanism for pulling the sheet through said cutting means, further feed mechanism beyond said first mentioned mechanism for preventing slack between said feed mechanisms, cut off mechanism for cutting the sheet in two between said feed mechanisms, and means beyond the second mentioned feed mechanism for separately slitting the cut off sections.

8. A machine for cutting multiple shingle strips of the character described, including means for cutting openings at intervals along the length of a sheet, feed mechanism for advancing the sheet through said cutting means, further feed mechanism beyond said first mentioned mechanism and operating at higher surface speed to prevent slack between said feed mechanisms, and cut off mechanism for cutting the sheet in two between said feed mechanisms, said second mentioned feed mechanism serving to advance the cut off sections at a more rapid rate than the rate of advancement of the body of the sheet.

9. A machine for cutting a sheet into multiple shingle strips of the character described including means for cutting lengthwise of the sheet, a row of apertures, means for cutting the sheet transversely into separate sections, means for continuously advancing the sheet at a uniform rate through both of said cutting means, separate means for advancing the cut off sections at a faster rate, and means for slitting each cut off section lengthwise thereof.

10. A machine for cutting a sheet into multiple shingle strips of the character described, including sheet feeding mechanism, means beyond said mechanism for cutting perforations in the sheet, a second feed mechanism beyond said cutting means, a third feed mechanism beyond said second mentioned feed mechanism for holding the sheet taut between said second and third feed mechanisms, cut off mechanism operating between said second and third feeding mechanisms, means for slitting the sections lengthwise after they are cut off, and feed mechanism for the separate strips beyond said slitting means.

11. A machine of the class described, including two spaced sheet feeding mechanisms, the second operating at a slightly higher surface speed than the first to hold the sheet taut therebetween, cut off mechanism operating to sever the sheet transversely between said feed mechanisms, and means beyond the second feed mechanism for slitting the sheets lengthwise, said second feeding mechanism serving to deliver the cut off sections directly from the cut off mechanism into said slitting means.

12. A machine of the class described, including a pair of spaced sheet feeding mechanisms arranged along the path of movement of the sheet, a cut off mechanism movable back and forth between said feed mechanisms, and flexible means between said cut off mechanism and each of said feed mechanisms for supporting the sheet therebetween.

13. A machine of the class described, including a pair of spaced sheet feeding mechanisms arranged along the path of movement of the sheet, a cut off mechanism movable back and forth between said feed mechanisms, and flexible means between said cut off mechanism and each of said feed mechanisms for supporting the sheet therebetween, said last mentioned means being attached to said cut off mechanism and movable back and forth therewith.

14. A machine of the class described, including cut off mechanism movable back and forth along the path of travel of the sheet to be cut, slitting mechanism beyond said cut off mechanism, and a pair of feed rolls between said cut off mechanism and said slitting mechanism, and serving to receive the advancing end of the sheet before being cut off, and to deliver the cut off section through the slitting mechanism.

15. A machine of the class described, including cut off mechanism movable back and forth along the path of travel of the sheet to be cut, slitting mechanism beyond said cut off mechanism, a pair of feed rolls between said cut off mechanism and said slitting mechanism and serving to receive the advancing end of the sheets before being cut off, and to deliver the cut off section through the slitting mechanism, and a flexible support secured to said cut off mechanism and movable back and forth between said feed rolls.

16. A machine of the class described, including a cut off mechanism movable back and forth along the path of travel of the sheet to be cut, slitting mechanism for subdividing the cut off sections into strips lengthwise of the sheet, a pair of feed rolls between the cut off mechanism and the slitting mechanism, the lower roll having portions of reduced diameter, a plurality of flexible belts each having one end secured to said cut off mechanism and extending between said feed rolls at the points of reduced diameter of the lower roll, and means connected to said belts for holding them taut.

17. A machine of the class described including two pairs of feed rolls, the lower roll of each pair having spaced sheet engaging portions, a cut off mechanism movable back and forth along the path of the flexible sheet between said pairs of rolls, and sheet supporting members secured to said cut off mechanism and extending therefrom in opposite directions between said spaced portions of each pair, and movable back and forth with said cut off mechanism.

18. A machine of the class described, including two pairs of feed rolls, the lower roll of each pair having portions of reduced diameter, a cut off mechanism movable back and forth along the path of the sheet between said pairs of rolls, and sheet supporting belts secured to said cut off mechanism and extending therefrom in opposite directions between the two rolls of each pair at the points of reduced diameter, and movable back and forth with said cut off mechanism and forming a continuous support from one pair of feed rolls to the other.

19. A machine of the character described, including cut-off mechanism movable back and forth, a pair of feed rolls for delivering sheet material to said cut off mechanism, the lower feed roll including spaced sheet feeding sections, and intermediate rollers of reduced diameter, a plurality of belts secured to said cut off mechanism and extending between said feed rolls over said rollers, and means for holding said belts taut during the back and forth movement of the cut off mechanism.

20. A machine of the class described, including two pairs of feed rolls, the lower roll of one pair serving as a pulley for a conveyor belt, and the lower roll of the other pair having alternately spaced sheet engaging portions and idler portions of reduced diameter, cut off mechanism movable back and forth along the path of movement of the material, belts secured to said cut off mechanism and extending over said idler portions to support the sheet at the transverse cuts as the sheet travels through the cut off mechanism and through the second mentioned feed rolls, and sheet slitting mechanism between the two pairs of feed rolls.

21. A machine of the class described, including a cutter movable back and forth in the general direction of the path of the material to be cut, belts secured thereto and extending in opposite directions therefrom, separate pairs of feed rollers at opposite sides of said cutter, said belts being movable back and forth between said feed rollers and forming a substantially continuous support for the material from one pair of feed rollers to the other.

22. A machine of the class described, including two pairs of superposed rollers, the lower roller of each pair having portions of reduced diameter, a cut off mechanism disposed between said pairs and movable back and forth in the direction of travel of material from one pair of rollers to the other, and flexible members secured to said cut off mechanism and extending in opposite directions therefrom between the rollers of each pair at the points of reduced diameter to form a substantially continuous support from one pair of rollers to the other.

23. A machine of the class described, including a pair of rotary members for acting upon a sheet of material passing therebetween, a pair of coacting cutters movable back and forth in the general direction of the delivery of said material, a pair of feed rollers between said rotary members and said cutters, and a pair of pivoted arms for supporting the upper roller of said pair and permitting vertical movement thereof.

24. A machine of the class described, including a pair of rotary members for acting upon a sheet of material passing therebetween, a pair of coacting cutters movable back and forth in the general direction of the delivery of said material, a pair of feed rollers between said rotary members and said cutters, and a pair of pivoted arms for supporting the upper roller of said pair and permitting vertical movement thereof, one of said arms having power transmitting mechanism extending from the pivotal support of the arm to the upper feed roller for rotating the latter.

25. A machine of the class described, including a drive shaft, sheet feeding mechanism operated thereby, a pair of coacting rotary cutters driven from said drive shaft for cutting slits in the sheet, a cut off mechanism independently driven from said drive shaft for subdividing the sheet into sections, and means in the driving connection between said cutters and said drive shaft for rotatably adjusting both of said cutters in respect to the drive shaft and said cut-off mechanism.

26. A machine of the class described, including feeding mechanism for sheet material, means for cutting a row of pairs of slits in the sheet, means for cutting two rows of shorter slits to form with said first mentioned pairs of slits a row of transversely extending openings, and means for cutting the sheet lengthwise along a line intersecting said openings.

27. A machine of the class described, including feeding mechanism for sheet material, means for cutting a row of pairs of slits in the sheet, means for cutting rows of shorter slits to form with said first mentioned pairs of slits a row of transversely extending openings, said row extending lengthwise of the sheet and means for cutting the sheet transversely into sections, the spacing between the transverse cuts being a multiple of the spacing between said opening.

28. A machine of the class described, including sheet feeding mechanism, means for cutting a row of pairs of slits in the sheet, means for cutting a second row of pairs of slits cooperating with the first mentioned slits to form a row of transversely extending openings in the sheet, and means for cutting the sheet lengthwise along a line intermediate of the opposite ends of the openings of said row.

29. A machine of the class described, including sheet feeding mechanism, means for cutting a row of pairs of slits in the sheet, means for cutting a second row of pairs of slits cooperating with the first mentioned slits to form a row of transversely extending openings in the sheet lengthwise of the sheet, and cut off mechanism for cutting the sheet transversely into sections each having a plurality of openings of said row wholly within and spaced from the edges thereof.

30. A machine of the class described, including sheet feeding mechanism, means for cutting a row of pairs of slits in the sheet, means for cutting a second row of pairs of slits cooperating with the first mentioned slits to form a row of openings in the sheet, cut off mechanism for cutting the sheet transversely into sections each having a predetermined number of openings of said row, and means beyond said cut off mechanism for cutting each of said sections lengthwise along a line intersecting said row.

31. A machine of the class described, including sheet feeding mechanism, means for forming a row of transversely extending openings lengthwise of said sheet, means for cutting the sheet transversely into sections each having a predetermined number of said openings therein, and means beyond said cutting means for cutting each section lengthwise thereof along a line intersecting the row of openings.

32. A machine of the class described, including sheet feeding mechanism, means for forming a plurality of rows of pairs of transversely extending slits, means for connecting the two slits of each of said pairs at both ends, means for removing the portions of the sheet thus severed, to form lengthwise of the sheet a plurality of rows of transversely extending openings and means for cutting the sheet lengthwise thereof along a purality of lines each intersecting the openings of a separate row.

33. A machine of the class described, including means for forming a row of pairs of transversely extending slits in a sheet of material, means for connecting said pairs of slits at their ends and removing the material therebetween to form a row of openings, and means for cutting the sheet transversely and longitudinally into pieces each piece extending lengthwise of the sheet, and each having a plurality of said openings at one longitudinal edge of the piece.

34. A machine of the class described, including means for forming a row of pairs of transversely extending slits in a sheet of material, means for connecting said pairs of slits at their ends and removing the material therebetween to form a row of openings lengthwise of the sheet, and means for cutting the sheet into sections each having a plurality of the openings of said row therein wholly within and spaced from the edges thereof.

35. A machine of the class described, including means for forming a row of pairs of transversely extending slits in a sheet of material, means for connecting said pairs of slits at their ends and removing the material therebetween to form a row of openings, means beyond said first mentioned means for cutting the sheet into sections each having a plurality of said openings therein, and means beyond said second mentioned means for cutting each of said sections into pieces each having a plurality of said openings along one edge thereof.

36. A machine of the class described, including a pair of rotary cutters for forming a row of pairs of transverse slits, a second pair of rotary cutters for forming a row of pairs of longitudinal slits connecting the first mentioned slits at their ends, and means for slitting the sheet lengthwise along a line midway between the ends of the row of openings formed by said slits.

37. A machine of the class described, including a pair of rotary members, one having a groove extending lengthwise thereof, a pair of separate cutting blades mounted in said groove and adjustable lengthwise thereof, and presenting parallel spaced cutting edges, clamping screws projecting through a side wall of the groove to clamp said blades together and retain them in the groove and the other rotary member presenting a surface against which said edges act to cut a pair of parallel slits in a sheet passing between said members.

38. A machine of the class described, including a pair of rotary members for forming a row of pairs of slits in a sheet of material passing therebetween, one of said members having a groove lengthwise thereof, a pair of knives in said groove and beveled in opposite directions to present parallel spaced cutting edges, clamping members projecting through a side wall of the groove to clamp said knives together and retain them in the groove and the other of said members presenting a surface for coacting with said edges.

39. A machine of the class described, including a pair of rotary members each having a groove extending lengthwise thereof, a pair of parallel knives mounted in the groove of one member, a backing plate presenting a hardened surface and mounted in the groove of the other member, and means for rotatably adjusting one member in respect to the other to vary the lines of contact of the knives on said plate.

40. A machine of the class described, including a pair of rotary members each having a groove extending lengthwise thereof, a pair of parallel knives mounted in the groove of one member, a backing plate presenting a hardened surface and mounted in the groove of the other member, and means for axially adjusting one member in respect to the other.

41. A machine of the class described, including a pair of rotary members each having a groove extending lengthwise thereof, a pair of parallel knives mounted in the groove of one member, a backing plate presenting a hardened surface and mounted in the groove of the other member, means for axially adjusting one member in respect to the other, and means for rotatably adjusting one member in respect to the other.

42. A machine of the class described, including a pair of rotary members, one of said members presenting a pair of parallel spaced cutting edges extending lengthwise thereof, and the other of said members presenting a detachable plate having a hardened surface against which said edges may act to cut a pair of parallel slits in a sheet passing between said members, and means for rotatably adjusting one of said members in respect to the other to bring different portions of the surface of said plate into operative relationship to said cutting edges.

43. A machine of the class described, including a pair of rotary members, gears connecting said members for rotating them with the same surface speed and in opposite directions, a knife carried by one of said members and extending lengthwise thereof, the other of said members presenting a surface against which said knife may act to cut material passing therebetween, means for axially adjusting the first mentioned member in respect to the other, and means for rotatably adjusting one of said members in respect to its gear.

44. A machine of the class described, including a pair of coacting rotary members for forming transverse slits in a sheet of material passing therebetween, a pair of coacting rotary members for forming a series of longitudinal slits in said sheet, means for axially adjusting both members of one pair in respect to the other pair, and means for rotatably adjusting one pair in respect to the other.

45. A machine of the class described, including a pair of coacting rotary members for forming a row of spaced slits in a sheet of material passing therebetween, one of said members having an annular knife and the other of said members having an annular row of separate spaced knives for coacting therewith, and means for rotatably adjusting one of said members in respect to the other to bring different portions of said annular knife into operation.

46. A machine of the class described, including a pair of coacting rotary members for forming a row of spaced slits in a sheet of material passing therebetween, one of said members having an annular knife and the other of said members having an annular row of spaced knives for coacting therewith, a drive shaft, and means for simultaneously adjusting both of said shafts about their axes and in respect to said drive shaft.

47. A machine of the class described, including a pair of coacting rotary members for forming a row of spaced slits in a sheet of material passing therebetween, one of said members having an annular knife and the other of said members having an annular row of spaced knives for coacting therewith, said annular knife being adjustable circumferentially on its member to bring different portions of its cutting surface into operative engagement with the other knives.

48. A machine of the class described, including a pair of coacting rotary members for cutting a row of slits in a sheet of material passing therebetween, one of said members including a body portion presenting a series of radial grooves in the end wall thereof, separate knives mounted in said grooves and projecting beyond the periphery of the body portion, and a clamping plate for holding all of said knives in their respective grooves.

49. A machine of the class described, including a pair of coacting rotary members, one of said members having a groove extending lengthwise thereof, and the other of said members having a flange cooperating with said groove to remove a portion of the material from a sheet passing between said members, said groove having means for retaining therein the removed material.

50. A machine of the class described, including a pair of coacting rotary members, one of said members having a groove extending lengthwise thereof, and the other of said members having a flange cooperating with said groove to remove a portion of the material from a sheet passing between said members, said groove having radial pins for retaining therein the removed material.

51. A machine of the class described, including a pair of rotary coacting members one of said members having a pair of spaced circular knives and a series of longitudinal grooves extending from one knife to the other, and the other of said members having a pair of annular rows of spaced knives for coacting with said circular knives at points opposite the ends of said grooves.

52. A machine of the class described, including a pair of rotary coacting members one of said members having a pair of spaced circular knives and a series of longitudinal grooves extending from one knife to the other, and the other of said members having a pair of annular rows of spaced knives for coacting with said circular knives at points opposite the ends of said grooves, and a series of flanges for entering said grooves to remove the material severed by said knives.

53. A machine of the class described, including a pair of rotary coacting members, one of said members having a series of annular grooves and a series of longitudinal grooves, and the other of said members having a series of flanges for entering said longitudinal grooves to remove portions from a sheet of material passing between said members, and strippers disposed within said circumferential grooves to remove the severed portions from said longitudinal grooves.

54. A machine of the class described, including a pair of rotary coacting members, one of said members having a series of annular grooves and a series of longitudinal grooves, and radial pins at the intersections of said groove, and the other of said members having means for entering said longitudinal grooves to remove portions from a sheet of material passing between said members, and strippers disposed within said circumferential grooves to remove the severed portions from said longitudinal grooves.

55. A machine of the class described, including a pair of rotary members coacting to sever portions from a sheet of material passing therebetween, one of said members having a series of radial pins for receiving and retaining the severed portions, a plurality of bifurcated strippers engaging with said last mentioned member to remove the severed portions from said pins, and a trough extending substantially parallel to said members, said strippers serving as guides along which said severed portions may slide into said trough.

56. A machine of the class described, including a pair of rotary members coacting to sever portions from a sheet of material passing therebetween, one of said members having a series of radial pins for receiving and retaining the severed portions, a plurality of bifurcated strippers engaging with said last mentioned member to remove the severed portions from said pins, a trough extending substantially parallel to said members, said strippers serving as guides along which said severed portions may slide into said trough, and a conveyor movable lengthwise of said trough for discharging the severed portions from the latter.

57. A machine of the class described, including a pair of rotary members coacting to sever portions from a sheet of material passing therebetween, one of said members having a series of radial pins for receiving and retaining the severed portions, strippers for removing the material from said pins, a trough receiving the severed portions from said strippers, and a conveyor for discharging said ports from said trough.

58. A machine of the class described, including a pair of rotary members for forming transverse slits in a sheet of material passing therebetween, a pair of rotary members for forming longitudinal slits in said sheet in proper registry with said transverse slits, means for removing the severed pieces, and a conveyor for discharging the removed pieces.

59. A machine of the class described, including a pair of rotary members coacting to form slits in a sheet of material passing therebetween, eccentric bearing sleeves for adjusting one of said members toward and from the other and pivoted links detachably secured to said sleeves for permitting rotation thereof or locking in predetermined adjustment.

60. A machine of the class described, including a pair of rotary members coacting to form slits in a sheet of material passing therebetween and means for adjusting one of said members toward and from the other, said means comprising rotatable bearing sleeves eccentric to the axis of the member and adjustable stops movable into or out of engagement with said sleeves and adjustable along the periphery thereof.

61. A machine of the class described, including means for cutting a longitudinally extending row of slits in a sheet of prepared roofing material, means for cutting the sheet lengthwise at spaced points along two spaced rows to connect the two slits of each pair, means therebeyond for cutting the sheet transversely into sections, means beyond the last mentioned cutting means for cutting each section lengthwise to form the finished strips, and means for continuously advancing the sheet during all of said cutting operations 62. A machine for making shingle strips, each strip presenting a series of tabs and narrower interposed recesses along one longitudinal edge thereof, said machine including means for cutting out portions of the strip corresponding in position to the desired recesses, means for cutting the sheet transversely into sections, means beyond the last mentioned cutting means for cutting the separate successive sections lengthwise thereof, and means for continuously advancing the sheet, sections and strips through the several cutting means in succession.

63. A machine for forming shingle strips, including feeding mechanism for the sheet material, means for cutting lengthwise of the sheet a row of transversely extending openings intermediate of and spaced from the side edges of the sheet, and cut-off mechanism for cutting the sheet transversely into sections each having a plurality of openings of said row wholly within and spaced from the edges thereof.

64. A machine for making shingle strips, including sheet feeding mechanism, a plurality of pairs of rotary coacting members each pair acting to cut slits in the sheet and the parts being so positioned that the slits register to define a row of transversely extending openings in the sheet lengthwise of the latter, and means for cutting the sheet into sections each having a plurality of openings of said row wholly within and spaced from the edges thereof.

65. A machine for making shingle strips, including a plurality of pairs of rotary members, means for feeding a sheet of material between the two members of each pair in succession, each pair serving to form separate slits in the sheet, and the several slits registering to define a row of openings extending lengthwise of the sheet intermediate of the side edges thereof, the last pair of rotary members having means for removing from the openings the severed material circumscribed by the several slits, and means for slitting the sheet along a line intersecting the openings of said row.

Signed at New York in the county of New York and State of New York this 17th day of April A. D. 1922.

SAMUEL M. LANGSTON.

Certificate of Correction.

It is hereby certified that in Letters Patent No. 1,462,138, granted July 17, 1923, upon the application of Samuel M. Langston, of Wenonah, New Jersey, for an improvement in "Machines for Making Fiber Shingles," an error appears in the printed specification requiring correction as follows: Page 6, lines 73 and 74, strike out the words "aforesaid Patent No. 1,441,359, granted January 9, 1923" and insert instead *copending application Serial No. 649,282, filed July 3, 1923.;* and that the said Letters Patent should be read with this correction therein that the same may conform to the record of the case in the Patent Office.

Signed and sealed this 14th day of August, A. D., 1923.

[SEAL.]

KARL FENNING,
*Acting Commissioner of Patents.*